: (12) United States Patent
Kramer et al.

(10) Patent No.: US 7,617,011 B2
(45) Date of Patent: Nov. 10, 2009

(54) AUTOMATION SYSTEM

(75) Inventors: Dieter Kramer, Dresden (DE);
Gerhard Lang, Wilhelmshorst (DE);
Götz Neumann, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 113 days.

(21) Appl. No.: 11/795,473

(22) PCT Filed: Jan. 6, 2006

(86) PCT No.: PCT/EP2006/050063

§ 371 (c)(1),
(2), (4) Date: Jul. 17, 2007

(87) PCT Pub. No.: WO2006/074981

PCT Pub. Date: Jul. 20, 2006

(65) Prior Publication Data

US 2008/0154388 A1 Jun. 26, 2008

(30) Foreign Application Priority Data

Jan. 17, 2005 (DE) ........................ 10 2005 002 743

(51) Int. Cl.
*G06F 15/46* (2006.01)
(52) U.S. Cl. ............................ 700/83; 700/9; 700/291; 370/470; 709/201; 717/168
(58) Field of Classification Search ................ 700/9, 700/83, 291; 702/57, 64, 77; 709/201, 206, 709/227, 238; 717/168; 370/470
See application file for complete search history.

(56) References Cited

U.S. PATENT DOCUMENTS

| | | | |
|---|---|---|---|
| 4,901,218 A | 2/1990 | Cornwell | |
| 6,560,235 B1 | 5/2003 | Jones | |

(Continued)

FOREIGN PATENT DOCUMENTS

DE 20 2004 000 928 U1 7/2004

(Continued)

OTHER PUBLICATIONS

Schwager, Dr. Jürgen; "Ethernet erreicht das Feld", Teil 1 und 2, Elektronik Nov. 2004 and Elektronik 13/2004.

(Continued)

*Primary Examiner*—Albert DeCady
*Assistant Examiner*—Douglas S Lee
(74) *Attorney, Agent, or Firm*—Laurence A. Greenberg; Werner H. Stemer; Ralph E. Locher

(57) ABSTRACT

An automation system includes at least one device that detects measured values and is connected to a automated process, at least one field device connected to the at least one device detecting measured values, and a master computer connected to the at least one field device. In order to simplify the design of such an automation system as much as possible, the device detecting measured values, the field device, and the master computer are connected to a common data transmission network which is equipped for transmitting digital measured data from the device detecting measured values to the field device according to a first communication protocol and for transmitting digital control data between the field device and the master computer according to a second communication protocol.

8 Claims, 1 Drawing Sheet

U.S. PATENT DOCUMENTS

| | | |
|---|---|---|
| 2002/0103946 A1 | 8/2002 | Gaiser |
| 2002/0183863 A1 | 12/2002 | Eryurek |
| 2003/0023795 A1 | 1/2003 | Packwood et al. |
| 2004/0059469 A1* | 3/2004 | Hart ............................ 700/291 |
| 2004/0066798 A1* | 4/2004 | Reuschen et al. ........... 370/470 |
| 2004/0205111 A1* | 10/2004 | Chasmawala et al. ....... 709/201 |
| 2007/0168060 A1* | 7/2007 | Nixon et al. ................... 700/83 |
| 2007/0179641 A1* | 8/2007 | Lucas et al. .................... 700/83 |
| 2007/0255348 A1* | 11/2007 | Holtzclaw .................... 607/60 |
| 2008/0209505 A1* | 8/2008 | Ghai et al. ..................... 726/1 |
| 2008/0288933 A1* | 11/2008 | Budmiger et al. ........... 717/168 |

FOREIGN PATENT DOCUMENTS

| | | |
|---|---|---|
| DE | 102 60 806 A1 | 7/2004 |
| WO | 98/14853 | 4/1998 |
| WO | 00/03521 | 1/2000 |

OTHER PUBLICATIONS

Siemens AG Info: SICAM HV- Digitale Leistungsschaltersteuerung (Digital Breaker Control DBC).

* cited by examiner

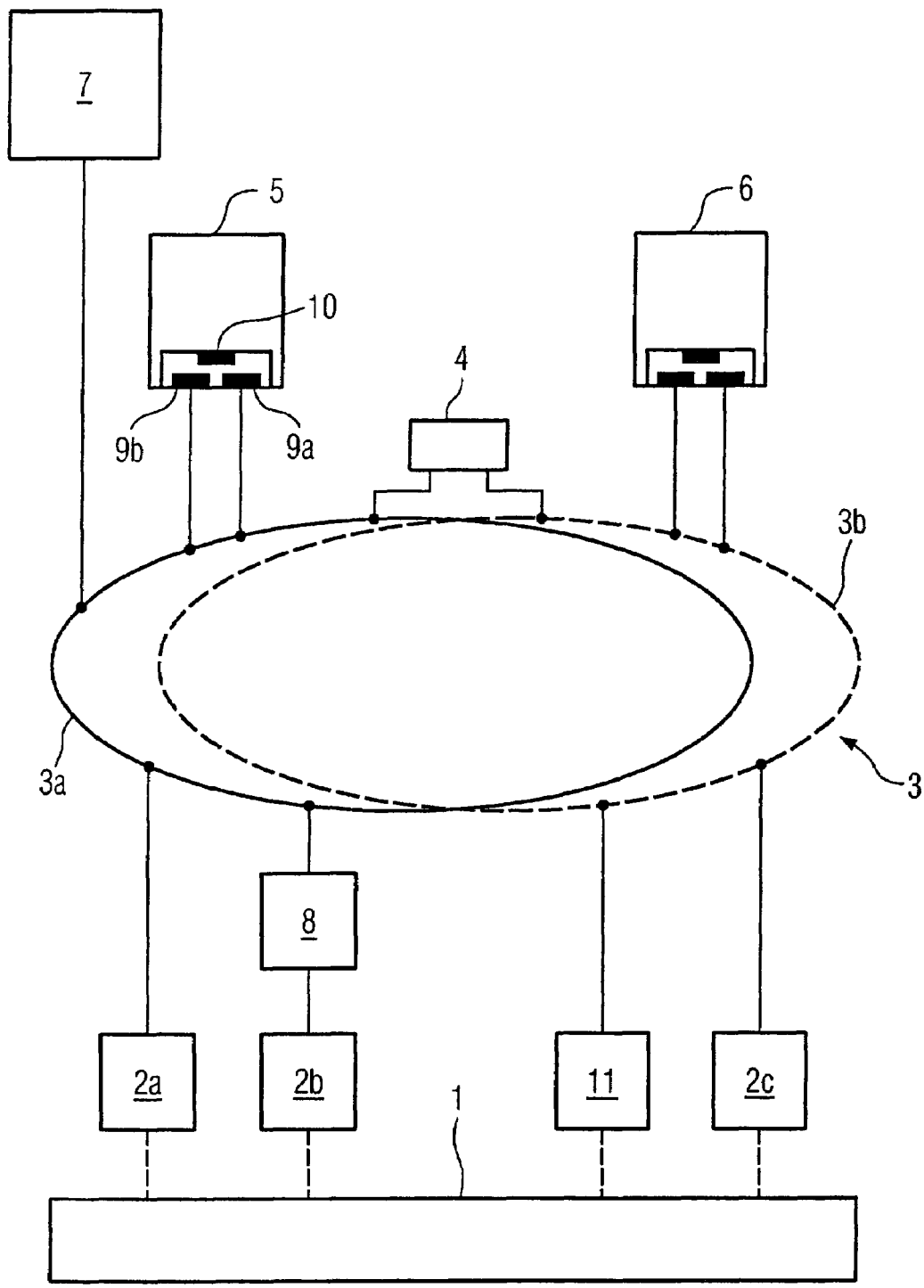

AUTOMATION SYSTEM

BACKGROUND OF THE INVENTION

Field of the Invention

The invention relates to an automation system having at least one measured-value detection device which is connected to an automated process, and having at least one field device, which is connected to the at least one measured-value detection device, and a host computer which is connected to the at least one field device.

An automation system such as this is known, for example, from the "SICAM HV—Digitale Leistungsschaltersteuerung (Digital Breaker Control DBC)", Information Sheet Order No. E5001-U113-A230/1 from Siemens AG. The Information Sheet discloses, specifically an automation system having a plurality of bus levels for an automated process, in this case relating to a power supply system. Converters, as measured-value detection devices and switch controls, are connected via a so-called process bus to field devices in the form of process controllers and protective devices. The field devices are in turn connected via a so-called field bus to a local controller, as a host computer. In addition to control commands for the switch controllers, the measured data detected by the converters, such as current and voltage measured-values are normally transmitted to the field devices via the process bus. Furthermore, the field devices can receive control commands via the field bus from the host computer and, in the opposite direction, can pass on information about the automated process to the local controller, for example in order to display information on a display system in a control panel.

SUMMARY OF THE INVENTION

The invention is based on the object of simplifying even further a design of an automation system of this generic type.

According to the invention, this object is achieved by an automation system of the type mentioned above, in which the at least one measured-value detection device, the at least one field device and the host computer are connected to a common data transmission network which is designed to transmit digital measured data from the at least one measured-value detection device to the at least one field device using a first communication protocol, and to transmit digital control data between the at least one field device and the host computer using a second communication protocol. The automation system according to the invention now has only one data transmission network, to which all of the components of the automation system are connected, instead of two mutually independent bus systems. In order to allow both digital measured data and digital control data to be transmitted via the data transmission network, it is suitable for transmitting the respective data using different communication protocols. Since there is only one network, to which all of the components of the automation system are connected, this further simplifies the design of the automation system.

According to one advantageous embodiment of the automation system according to the invention, the data transmission network is a Real-Time Ethernet network. Because of its high transmission rates and predictable transmission durations, the use of a Real-Time Ethernet network allows real time applications to be carried out in the automation system. Furthermore, the Real-Time Ethernet network also allows synchronization of measured data and control commands that are passed to the data transmission network.

Furthermore, one advantageous development of the automation system according to the invention provides that actuator devices are also connected to the data transmission network, and are connected on the output side to the automated process. In this case, it is also possible to include actuators such as circuit breaker controllers in the common data transmission network.

A further advantageous embodiment of the automation system according to the invention provides for the data transmission network to have a ring structure. A network structure such as this generally corresponds best to the design and local characteristics of an automation system.

According to a further advantageous embodiment of the automation system according to the invention, the data transmission network comprises at least two mutually redundant network elements. This allows the availability and reliability of the installation to be further increased.

One advantageous embodiment of the automation system according to the invention furthermore provides for the at least one measured-value detection device to have an analog/digital converter and a network connecting device for connection to the data transmission network. This allows measured-value detection devices to be connected to the data transmission network particularly easily, and without additional components.

In order to allow already existing measured-value detection devices to still be operated in the automation system according to the invention, one alternative embodiment provides for the at least one measured-value detection device for conversion of the measured data to the first communication protocol to be connected to the conversion device which is connected on the output side to the data transmission network.

Finally a further advantageous embodiment of the automation system according to the invention provides for the at least one field device and/or the at least one measured-value detection device to each be connected via a network connecting device to the data transmission network, with the network connecting device having one and only one internal port, which is connected to the at least one field device or to the measured-value detection device and two, and only two, external ports which are connected to the data transmission network. Network connecting devices such as these such as those known from DE 102 60 806 A1 ensure a simple capability to connect the field devices and/or the measured-value detection device to the data transmission network.

BRIEF DESCRIPTION OF THE SEVERAL VIEWS OF THE DRAWINGS

In order to explain the invention further, the FIGURE provides a schematic illustration of the design of an automation system.

DESCRIPTION OF THE INVENTION

In this case the FIGURE shows an automated process 1, which is not specified in any more detail, illustrated in a very highly schematic form. An automated process 1 such as this may, for example, be a chemical, technical or biotechnological process, an industrial manufacturing process or else a process for transmitting and distributing water, gas or electrical power. For the following statements, it should be assumed that the process 1 is a process for transmitting and distributing electrical power, for example an electrical power transmission system. In addition to actuator devices 11, such as switch controllers, measured-value detection devices 2a to 2c are connected to the process. These measured-value detection devices may be sensors as well as conventional current transformers or voltage transformers, for example toroidal-core transformers, or so-called unconventional converters, such as uniform-field coils or optical transducers. The measured-value detection devices 2a to 2c are connected to the process 1 in a manner corresponding to their embodiment; this is indicated by a dashed line in the FIGURE. The measured-value detection devices 2a to 2c are also connected directly or indirectly to a data transmission network 3, which comprises two mutually redundant network elements 3a and 3b, of which the network element 3b is illustrated by dashed lines in the FIGURE, for the sake of clarity. Although this exemplary embodiment makes reference to two network elements, there may, of course, be any desired number of network elements in practice. As shown in FIG. 1, the network elements 3a, 3b are networks with a ring structure; alternatively, of course, a conventional star structure can also be used. The two network elements 3a and 3b are connected to one another via a switch 4, so that data can be transmitted from one network element 3a to the other network element 3b, and vice versa. The data transmission network 3 is preferably an Ethernet network in the form of a so-called Real-Time Ethernet network. An IEC international working group are currently working on standardization of this Ethernet standard.

Field devices 5 and 6 are also connected to the data transmission network 3. In this case, by way of example, the field device 5 may be an electrical protective device, and the field device 6 a process controller. Furthermore, the data transmission network 3 is connected to a host computer 7 which, for example, may be a station host computer or a central host computer in a so-called control center.

The method of operation of the described automation system will be explained in the following text:

Measured values which describe the process 1 are detected via the measured-value detection devices 2a to 2c, with this being, for example, current or voltage measured values. In this case, the measured-value detection devices 2a and 2c already have an analog/digital conversion device and a device for network connection. The measured-value detection devices 2a and 2c can therefore be connected directly to the data transmission network 3, and supply digital measured data corresponding to the recorded measured values to the data transmission network 3 using a first communication protocol. By way of example, this first communication protocol may be the IEC 61850-9-2 communication protocol, by means of which the IEC has defined the transmission of digital sample values in systems which are designed in accordance with IEC Standard 61850.

In contrast, the measured-value detection devices 2b have no integrated analog/digital converter and no network connection, so that they first of all transmit their recorded measured values to a conversion device 8, also referred to as a so-called "merging unit", which then carries out analog/digital conversion and conversion of the measured values to digital measured data, using the first communication protocol that is used in the data transmission network 3. The conversion device has a network connection via which it can pass measured data directly to the data transmission network 3.

The digital measured data is transmitted in the data transmission network 3 to the field devices 5 and 6, which carry out automation and control functions on the basis of the transmitted measured data. The field devices 5 and 6 can in turn pass control data to the data transmission network 3, with this data being transmitted using a second communication protocol for example the IEC 61850-8-1 communication protocol. In this protocol the IEC has defined the transmission of digital monitoring data, control data and control center data for systems which comply with IEC-61850, referred to in a summarized form here as control data. The digital control data can be transmitted on the one hand to the host computer 7, which can carry out further processing, archiving and conditioning of the data. In addition, digital control data can be transmitted to the actuator devices, such as circuit breaker controllers, which can in turn act on the process. The field devices 5 and 6 can therefore directly influence the process 1 via the data transmission network 3.

In industrial automation systems such as the automation system described here, time synchronization of the individual data items transmitted via the data transmission network 3 often plays a very important role. In previous automation systems, a separate synchronization network generally had to be set up for this purpose, which distributed a clock generated by a central timer sender, for example one pulse per second, to the individual components of the automation system, thus allowing accurate time stamping of the transmitted and received digital data. The Real-Time Ethernet network standard does not require any such separate synchronization network. In this case, appropriate controllers or specifically designed integrated circuit modules in the form of ASICs (application specific integrated circuit), FPGAs (field programmable gate array) or EPLDS (electrically programmable logic device) are used within the network connection for all of the components which are connected to the data transmission network, and can implement appropriate time identification for the digital and measured or control data in accordance with the Real-Time Ethernet-Standard. This represents a major simplification to the design of the automation system.

As is indicated only schematically in the FIGURE, the network connection of the field devices 5 and 6 may, for example have a network connecting device with two and only two external ports 91, 9b, by means of which the field device is connected to the data transmission network 3. In addition, the network connecting device may have one and only one internal port 10, by means of which it is connected to the appropriate field device. The ports 9a, 9b and 10 are connected to one another via an appropriate hard-wired circuit which, for example is described in German Application DE 102 60 806 A1. A network connecting device such as this at the same time provides a switch functionality, so that received and transmitted data can be transmitted without any time delay between the individual ports of network connecting device, as a result of which no relevant time loss occurs during the data transmission in the data transmission network 3. Appropriate network connecting devices may be provided in the measured-value detection devices 2a, 2b 2c and/or in the actuator devices 11.

The invention claimed is:

1. An automation system for a power supply system, comprising:
   at least one measured-value detection device connected to an automated process for transmitting and distributing electrical power;
   at least one electrical protective device connected to said at least one measured-value detection device;
   a host computer connected to said at least one electrical protective device;
   a common data transmission network connected between said at least one measured-value detection device, said at least one electrical protective device, and said host computer; and
   said common data communication network being configured to transmit digital measured data from said at least one measured-value detection device to said at least one electrical protective device using a first communication protocol, and to transmit digital control data between said at least one electrical protective device and said host computer using a second communication protocol different from said first communication protocol.

2. The automation system according to claim 1, wherein said data transmission network is a Real-Time-Ethernet Network.

3. The automation system according to claim 1, which comprises actuator devices connected to said data transmission network and connected on an output side to the automated process.

4. The automation system according to claim 1, wherein said data transmission network has a ring structure.

5. The automation system according to claim 1, wherein said data transmission network comprises at least two mutually redundant network elements.

6. The automation system according to claim 1, wherein said at least one measured-value detection device has an analog/digital converter and a network connecting device for connection to said data transmission network.

7. The automation system according to claim 1, wherein said at least one measured-value detection device is connected to a conversion device for converting the measured data to the first communication protocol, and said conversion device has an output side connected to said data transmission network.

8. The automation system according to claim 1, which comprises a network connecting device disposed to connect at least one of said at least one electrical protective device and/or said at least one measured-value detection device to said data transmission network, said network connecting device having only a single internal port and only two external ports, and wherein said internal port is connected to said at least one electrical protective device or to said measured-value detection device and said two external ports are connected to said data transmission network.

* * * * *